(No Model.)
O. M. ARNOLD.
MEAT TENDERER.
No. 478,547. Patented July 12, 1892.
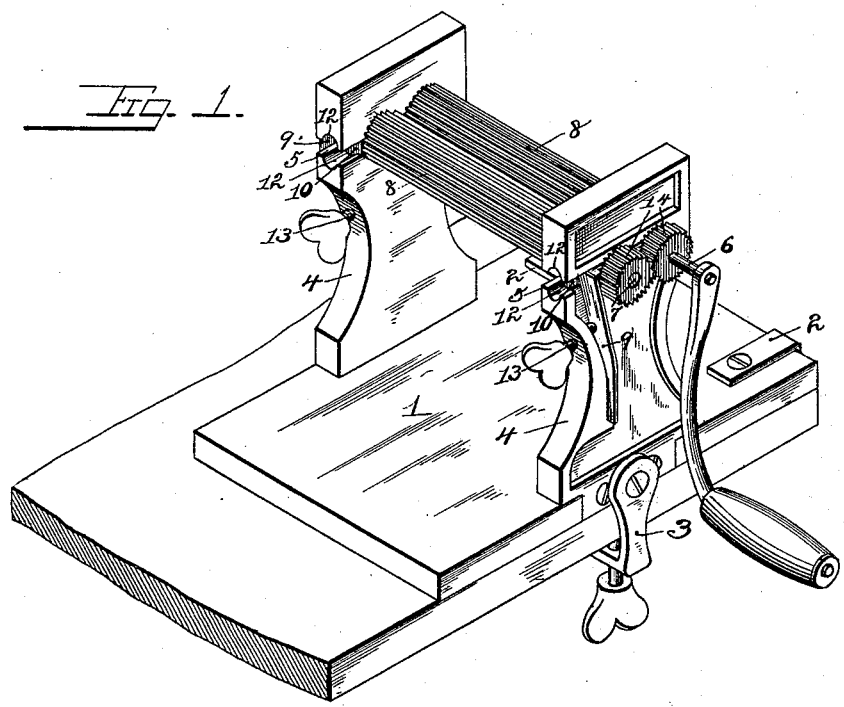
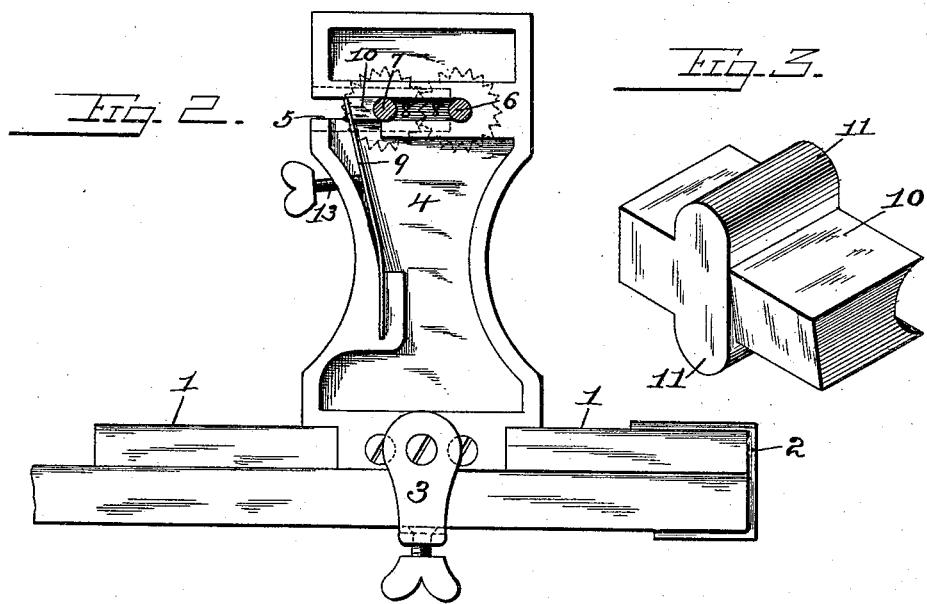
Witnesses
Inventor
Oscar M Arnold
By his Attorneys,

UNITED STATES PATENT OFFICE.

OSCAR M. ARNOLD, OF SEARCY, ARKANSAS, ASSIGNOR OF ONE-THIRD TO ALBERT T. SHERROD, OF SAME PLACE.

MEAT-TENDERER.

SPECIFICATION forming part of Letters Patent No. 478,547, dated July 12, 1892.

Application filed February 15, 1892. Serial No. 421,591. (No model.)

*To all whom it may concern:*

Be it known that I, OSCAR M. ARNOLD, a citizen of the United States, residing at Searcy, in the county of White and State of Arkansas, have invented a new and useful Meat-Tenderer, of which the following is a specification.

The invention relates to improvements in meat-tenderers.

The object of the present invention is to provide a simple and inexpensive meat-tenderer, adapted to conform readily to the varying thicknesses of meat and capable of operating quickly on the same.

The invention consists in the construction and novel combination and arrangement of parts hereinafter fully described, illustrated in the accompanying drawings, and pointed out in the claim hereto appended.

In the drawings, Figure 1 is a perspective view of a meat-tenderer constructed in accordance with this invention. Fig. 2 is a vertical sectional view, the section being taken through the shafts between the pinion and the adjacent standard. Fig. 3 is a detail perspective view of one of the bearing-blocks.

Like numerals of reference indicate corresponding parts in all the figures of the drawings.

1 designates a supporting-base designed to be secured to the edge of a table by hooks 2 and a clamp 3, and having, rising from opposite sides of it, standards 4, which are provided at their upper ends with grooved bearing-slots 5, adapted for the reception of shafts 6 and 7, and having their outer ends opened at the adjacent sides of the standards. The shafts 6 and 7 are journaled in the bearing-slots and carry corrugated rolls 8, between which is passed the meat to be made tender, and which are enabled to exert the desired pressure upon the meat by springs 9, arranged on the outer faces of the standards to which their lower ends are secured, and having their upper ends free and engaging blocks 10, arranged in the bearing-slots and provided with rounded lugs 11, fitting in the grooves 12. The springs are held at the desired tension by adjusting-screws 13, which are mounted in the standards, and which engage the springs to force them against the bearing-blocks. The shaft 6 has one of its ends extended beyond the adjacent standard and provided with a crank-handle, by means of which the meat-tenderer is operated. The hooks 2 are arranged at one end of the base, and are adapted to extend under and engage the lower face of the top of the table. The clamp is arranged at one side of the base and has a screw for clamping the lower face of the table-top.

It will be seen that the meat-tenderer is simple and comparatively inexpensive in construction, that it is capable of readily adjusting itself to the thickness of meat, that the pressure of the rolls upon the meat may be regulated, and that the meat may be quickly operated on. The shafts are geared together by pinions 14, which are arranged at the outer face of one of the standards a short distance therefrom. The bearing-blocks are provided with lateral extensions which project beyond the outer faces of the standards and are engaged by the upper ends of the springs.

What I claim is—

In a meat-tenderer, the combination of a base, standards rising from opposite sides of the base and provided at their upper ends with horizontal grooved bearing-slots, shafts geared together and journaled in the slots, the corrugated rolls mounted on the shafts, the bearing-blocks arranged in the bearing-slots and provided on their upper and lower faces with lugs fitting in the grooves thereof and having lateral extensions projecting outward beyond the standards, the springs arranged on the outer faces of the standards and engaging the lateral extensions of the bearing-blocks, and the adjusting-screws engaging the springs, substantially as described.

In testimony that I claim the foregoing as my own I have hereto affixed my signature in the presence of two witnesses.

OSCAR M. ARNOLD.

Witnesses:
J. C. HARDER,
W. H. ROYERS.